N. E. B. TALCOTT.
POULTRY FEEDER.
APPLICATION FILED OCT. 26, 1914. RENEWED APR. 15, 1916.

1,184,147.

Patented May 23, 1916.

Witnesses
Wynne Johnson

Inventor
N. E. B. Talcott
By C. L. Parker, Attorney

UNITED STATES PATENT OFFICE.

NATHAN EDMUNDSTON BERRY TALCOTT, OF RICHMOND, VIRGINIA.

POULTRY-FEEDER.

1,184,147. Specification of Letters Patent. Patented May 23, 1916.

Application filed October 26, 1914, Serial No. 868,733. Renewed April 15, 1916. Serial No. 92,070.

(DEDICATED TO THE PUBLIC.)

*To all whom it may concern:*

Be it known that I, NATHAN E. B. TALCOTT, a citizen of the United States, residing at Richmond, in the county of Henrico and State of Virginia, have invented certain new and useful Improvements in Poultry-Feeders, of which the following is a specification.

My invention relates to improvements in poultry feeders designed to feed young chickens.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

An important object of the invention is to provide a poultry feeder of the above mentioned character, having its perforated pecking portion or portions presenting no closed pockets or angles with the tray or trough of the apparatus, in which the chickens may get wedged and smothered, by the crowding in of the others, such pecking portion or portions being vertically spaced a substantial distance from the trough providing an opening through which the chickens will pass, upon crowding.

A further object of the invention is to provide a feeder of the above mentioned character, which will supply the feed in a proper manner without excessive feeding, upon the chickens pecking the perforated portions thereof, whereby a substantial economy is effected in the consumption of the same, and the unused feed retained clean prior to use.

A further object of the invention is to provide apparatus of the above mentioned character, having its perforated pecking portions so angularly arranged that the catching of the bills of the chickens therein, is eliminated.

A further object of the invention is to provide a feeder of the above mentioned character, having a large perforated pecking area, whereby the same may be employed to feed, at the same time, a large number of chickens, without crowding.

A further object of the invention is to provide apparatus of the above mentioned character, which is simple in construction, inexpensive to manufacture, strong, durable and reliable in operation.

Other objects and advantages of the invention will be apparent during the course of the following description.

Figure 1:
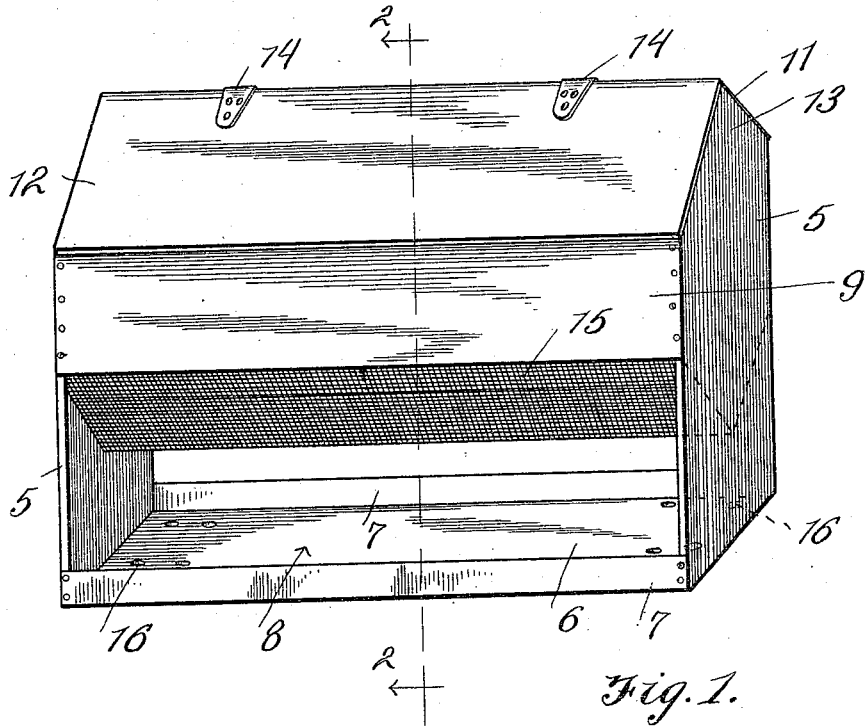
Figure 2:
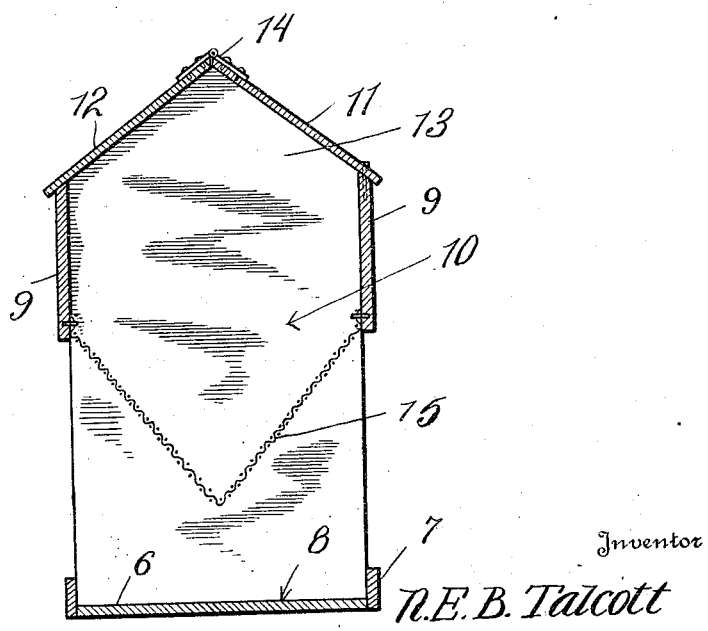

In the accompanying drawings forming a part of this specification and in which like numerals are employed to designate like parts throughout the same, Figure 1 is a perspective view of a chicken feeder embodying my invention, and, Fig. 2 is a transverse sectional view taken on line 2—2 of Fig. 1.

In the drawings, wherein for the purpose of illustration is shown a preferred embodiment of my invention, the numeral 5 designates substantially vertical end pieces, secured at their lower ends to a foundation 6, carrying side strips 7, forming a flat and shallow feed catching tray 8.

Secured to the upper portions of the end pieces 5 are side pieces 9, coöperating with the end pieces for forming the body portion of the hopper 10. The upper portion or top of this feed hopper is normally closed by lids or covers 11 and 12, which are angularly arranged and engage with tapered portions 13 of the end portions 5, as shown. The cover or lid 11 is preferably rigidly attached to the end portions 5 by any suitable means, while the cover 12 is pivotally connected therewith by means of hinges 14 or the like, to be swung to open and closed positions to afford access to the interior of the hopper. By having the covers or lids 11 and 12 inclined, the same provide a suitable shed for the feed hopper, preventing rain from entering the same, thus keeping the feed dry.

The feed hopper 10 has a substantially V-shaped perforated bottom 15, preferably formed of woven wire fabric of a suitable mesh while the same may be formed of perforated sheet metal or the like. This perforated substantially V-shaped bottom increases in width upwardly and has its upper edges attached to the side pieces 9, with its apex spaced a substantial distance from the feed catching tray 8, so that the chickens may readily pass through the tray or trough from one side thereof to the other, beneath the foraminous bottom. It has been found that by employing this substantially V-shaped perforated bottom, the feed is prevented from passing too freely therefrom, upon the chickens pecking the sides thereof, but will feed in proper amounts. This is due to the fact that as the feed descends in the hopper, the inclined walls of the perforated substantially V-shaped body portion exert a wedging effect upon the material, compressing the same to a certain extent, thus preventing excessive feeding. The further advantage in having this substantially V-shaped perforated bottom with its walls angularly arranged, is that in order to peck the same the chickens are forced to incline their heads upwardly, whereby the same are arranged at substantially a right angle to the walls thereof, which I have found prevents the chickens having their bills caught in the perforated material. A further advantage in my construction, with the perforated bottom or pecking surface spaced a substantial distance from the catching tray or trough, is that no closed pockets or angles are formed between the pecking surface and tray, but the chickens may pass through the tray from one side thereof to the other, beneath the pecking surface, thus effectually preventing crowding or wedging of the chickens, which not infrequently results in smothering. This construction further permits of all of the material which falls from the pecking surface, being caught in the tray, so that the same may be conveniently eaten by the chickens. While I have shown both sides of the substantially V-shaped bottom as being formed of perforated material, it is obvious that some degree of success is obtainable by having only one side thereof perforated.

In the use of the apparatus, the feed is placed within the hopper, and is supported by the substantially V-shaped perforated bottom 15. The chickens, when feeding, peck upon the inclined walls of this perforated bottom, whereby the feed passes therethrough in proper amounts without excessive feeding. The feed which the chickens do not catch when pecking is caught in the tray arranged directly below the substantially V-shaped perforated bottom, whereby the same may be consumed.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. A feeding apparatus for young chickens or the like, comprising a feed hopper having a depending perforated bottom substantially V-shaped in cross-section and tapering downwardly; a substantially flat feed catching tray arranged beneath the bottom of the hopper and spaced a substantial distance from the apex thereof to provide a passage whereby the chickens may conveniently pass from one side of the apparatus to the other without undue crowding; and means connecting the tray with the hopper.

2. A feeding apparatus for young chickens or the like, comprising a feed hopper having a bottom including a laterally inclined perforated wall; a substantially flat feed catching tray arranged beneath the bottom of the hopper and spaced a substantial distance from the lower end of the perforated wall to provide a passage whereby the chickens may conveniently pass from one side of the apparatus to the other without undue crowding; and means connecting the tray with the hopper.

In testimony whereof I affix my signature in presence of two witnesses.

NATHAN EDMUNDSTON BERRY TALCOTT.

Witnesses:
C. C. COCKE,
M. G. WALLACE.